US008981680B2

(12) United States Patent
Suda et al.

(10) Patent No.: US 8,981,680 B2
(45) Date of Patent: Mar. 17, 2015

(54) ELECTRIC POWER TOOL

(71) Applicants: Hidekazu Suda, Anjo (JP); Takuya Kusakawa, Anjo (JP); Jun Ota, Anjo (JP)

(72) Inventors: Hidekazu Suda, Anjo (JP); Takuya Kusakawa, Anjo (JP); Jun Ota, Anjo (JP)

(73) Assignee: Makita Corporation, Aichi (JP)

( * ) Notice: Subject to any disclaimer, the term of this patent is extended or adjusted under 35 U.S.C. 154(b) by 194 days.

(21) Appl. No.: 13/624,263

(22) Filed: Sep. 21, 2012

(65) Prior Publication Data

US 2013/0076271 A1 Mar. 28, 2013

(30) Foreign Application Priority Data

Sep. 26, 2011 (JP) ................................ 2011-209255

(51) Int. Cl.

| | |
|---|---|
| ***F04D 15/00*** | (2006.01) |
| ***H05B 37/00*** | (2006.01) |
| ***G05B 5/00*** | (2006.01) |
| ***B25F 5/02*** | (2006.01) |
| ***B25F 5/00*** | (2006.01) |

(52) U.S. Cl.

CPC .. *B25F 5/021* (2013.01); *B25F 5/00* (2013.01)
USPC ................................ 318/3; 315/314; 318/472

(58) Field of Classification Search

CPC .......... B25F 5/021; B25F 3/00; H02J 7/0008; B60Q 1/1461; B25B 21/00; B25B 21/007
USPC .................... 318/3, 39, 161; 315/314; 173/47
See application file for complete search history.

(56) References Cited

U.S. PATENT DOCUMENTS

| | | | | |
|---|---|---|---|---|
| 5,867,743 | A * | 2/1999 | Ishiguro et al. | 396/287 |
| 6,206,538 | B1 * | 3/2001 | Lemoine | 362/119 |
| 2009/0309519 | A1 * | 12/2009 | Suzuki et al. | 315/314 |
| 2010/0117581 | A1 * | 5/2010 | Miwa et al. | 318/472 |
| 2010/0236801 | A1 * | 9/2010 | Furusawa et al. | 173/47 |
| 2011/0114347 | A1 * | 5/2011 | Kasuya et al. | 173/11 |

FOREIGN PATENT DOCUMENTS

| | | | |
|---|---|---|---|
| EP | 2 474 391 | A1 | 7/2012 |
| JP | 2011-67910 | A | 4/2011 |
| JP | 2011-161533 | A | 8/2011 |

* cited by examiner

*Primary Examiner* — Bentsu Ro
*Assistant Examiner* — Zemenay Truneh
(74) *Attorney, Agent, or Firm* — Oliff PLC

(57) ABSTRACT

An electric power tool of the present invention includes: a lighting unit; a motor that drives a tool element; a setting switch that is turned ON/OFF to change an operation mode setting and a lighting mode setting; a setting switching unit that changes the operation mode setting and the lighting mode setting corresponding to a manner of operation provided to the setting switch; a motor control unit that controls the motor according to a control method for one of the operation modes currently set by the setting switching unit; and a lighting control unit that controls the lighting unit corresponding to one of the lighting modes currently set by the setting switching unit. When the setting switch is turned on, the setting switching unit changes one of the operation mode setting and the lighting mode setting corresponding to a duration time of an ON state of the setting switch.

11 Claims, 11 Drawing Sheets

ELECTRIC POWER TOOL

CROSS-REFERENCE TO RELATED APPLICATIONS

This application claims the benefit of Japanese Patent Application. No. 2011-209255 filed on Sep. 26, 2011 in Japan Patent Office, and the entire disclosure of the Japanese Patent Application No. 2011-209255 is incorporated herein by reference.

BACKGROUND

This invention relates to an electric power tool which has a lighting unit so as to illuminate an exterior thereof, and in which a setting of operation modes can be switched into one of a plurality of the operation modes.

A conventionally known electric power tool is provided with a lighting unit (a light) that illuminates in front of the tool, and constructed such that the tool can be operated in a selective manner chosen from one of the plurality of the operation modes.

Such electric power tool is provided with an operation mode changing switch, with which a user changes the operation modes, and a display unit that shows a currently-set operation mode. With regard to controlling the light, some electric power tools are constructed, such that the light is turned on while a user is operating a trigger switch, and is turned off when the trigger switch is not operated. Moreover, another type of electric power tool is also known wherein a user can change a setting regarding whether or not the light should be turned on when the trigger switch is operated (light setting). Such electric power tool, wherein the light setting can be changed, is proved with a light setting changing switch with which a user changes the light setting.

Therefore, the electric power tool wherein the operation modes and the light setting are changeable, is provided with an operation mode changing switch, a light setting changing switch, various switches for display, and a display unit (see, for example, Unexamined Japanese Patent Application Publication No. 2011-067910).

SUMMARY

However, if the types and the numbers of the various switches and the display units increase, the mounting area of these components in the electric power tool becomes larger, which makes the size and the cost of the electric power tool large. In the electric power tool disclosed in Unexamined Japanese Patent Application Publication No. 2011-067910, the switch panels are disposed in two separate positions, since many switches and display units are provided. Such structure is not preferable from the aspect of reducing the size and the cost of the electric power tool.

In order to inhibit the size and the cost of the electric power tool from being large, the switches, display units and the like that are necessary in the electric power tool are required to be disposed in a limited space. However, as the number of switches, display units, and so on increases, disposing all of such components in such limited space becomes more difficult.

One aspect of the present invention may preferably provide an electric power tool, in which a setting for turning on/off a lighting can be switched and a setting of operation modes can be switched into one of a plurality types of operation modes, and in which a space for disposing a switch used so as to change these settings can be decreased, which in turn enables to inhibit the electric power tool from being large, and to reduce the cost thereof.

The following describes the structure of the electric power tool according to the present invention.

An electric power tool according to the present invention has a plurality of operation modes and includes: a lighting unit that irradiates light to an exterior of the electric power tool; a motor that generates rotational driving force so as to drive a tool element; a setting switch that is turned ON/OFF so as to change a setting of the operation modes and a setting of lighting modes, the lighting modes indicating whether or not the lighting unit is turned on; a setting switching unit that changes the setting of the operation modes and the setting of the lighting modes corresponding to a manner of operation provided, to the setting switch; a motor control unit that controls the motor according to a control method for one of the operation modes currently set by the setting switching unit; and a lighting control unit that controls whether or not the lighting unit is turned on corresponding to one of the lighting modes currently set by the setting switching unit. When the setting switch is turned on, the setting switching unit changes one of the setting of the operation modes and the setting of the lighting modes corresponding to a duration time of an ON state of the setting switch.

In the electric power tool constructed above, a single setting switch is used for changing both the setting of the operation modes and the setting of the lighting modes. When the setting switch is operated, it is distinguished which of the setting of the operation modes or the setting of the lighting modes should be changed by the length of the period in which the setting switch is maintained to be ON.

As described above, the electric power tool according to the present invention is not provided individual switches respectively for changing the setting of the operation modes and for changing the setting of the lighting modes, but alternatively provided with one setting switch for both purposes. Therefore, a space for disposing the switch used so as to change the respective settings described above can be decreased. As a result, the electric power tool can be inhibited from being large, and the cost thereof can be reduced.

Various ways are possible for the setting switching unit to select one of the settings as a switching target corresponding to the duration time of the ON state. A target setting may be selected, for example, as described below. When the setting switch is turned on, the setting switching unit changes the setting of the operation modes if the duration time of the ON state is shorter than a predetermined period of time, and changes the setting of the lighting modes if the duration time of the ON state is equal to or longer than the predetermined period of time.

In consideration of an actual usage pattern of an electric power tool, the setting that is more frequently changed by users is generally the setting of the operation modes, rather than the setting of the lighting modes. Therefore, by setting the ON duration time for changing the setting of the operation modes shorter than the ON duration time for changing the setting of the lighting modes in the same manner as in the above-described structure, an electric power tool that is convenient for users can be provided.

Specific timing may be set in various ways for the setting switching unit to change the setting of the lighting modes when the ON duration time becomes equal to or longer than the predetermined period of time. For example, when the setting switch is turned on, the setting switching unit may change the setting of the lighting modes at an instant when the duration time of the ON state reaches the predetermined period of time. Alternatively, for example, the setting switching unit may change the setting of the lighting modes when the setting switch is turned on, when the duration time of the ON state reaches the predetermined period of time, and after the setting switch is turned off. However, in this case, the setting of the lighting modes may more preferably be changed at the instant when the setting switch is turned OFF.

As a result, the setting of the lighting modes can be reliably changed at any timing. However, in a case wherein the electric power tool is constructed so as to make users and the like aware in some way that switching has been done at the instant when the setting of the lighting modes is changed, the setting of the lighting modes may be preferably changed at the instant when the ON duration time reaches the predetermined period of time.

Specifically, various types of operation modes may be possible for the plurality of the operation modes. For example, the plurality of the operation modes may include at least two types of rotational speed setting modes each having different rotational speed of the motor. In this case, the motor control unit may control the motor, when the setting of the operation modes is set to one of the rotational speed setting modes, such that rotational speed of the motor corresponds to rotational speed predetermined in the one of the rotational speed setting modes.

By the electric power tool constructed as above, users may easily select/set appropriate rotational speed depending on the purpose of usage and the like of the electric power tool, and can be provided with an electric power tool that is more conveniently constructed for users.

Moreover, the plurality of the operation modes may include for example, at least two types of rotational torque setting modes each having different rotational torque of the motor. In this case, the motor control unit may control the motor, when the setting of the operation modes is set to one of the rotational torque setting modes, such that rotational torque of the motor corresponds to rotational torque predetermined in the one of the rotational torque setting modes.

By the electric power tool constructed as above, users can freely change the setting of the rotational torque, and can operate the electric power tool at rotational torque appropriate for the purpose of usage and the like. Therefore, an electric power tool that is more conveniently constructed for users can be provided.

Furthermore, the plurality of the operation modes may include, for example, at least a basic mode and a clutch mode. In this case, the electric power tool may include a start-up switch, operated so as to rotate the motor, and a torque detection unit that detects the rotational torque of the motor. In the basic mode, the motor is rotated while the start-up switch is on. On the other hand, in the clutch mode, when the motor is started to rotate by the start-up switch being turned on and the rotational torque detected by the torque detection unit becomes equal to or larger than a predetermined, torque threshold, the rotation of the motor is stopped even if the start-up switch is on.

Even by the electric power tool constructed as above, user can selectively use the basic mode and the clutch mode depending on the purpose of usage and the like. Therefore, an electric power tool that is conveniently constructed for users can be provided.

In a case wherein the electric power tool according to the present invention includes a display unit that shows one of the plurality of the operation modes that is currently set, the setting switch and the display unit are disposed on a single surface among externally exposed surfaces of the electric power tool. Owing to this construction, users can operate the setting switch, and also check displayed content shown by the display unit on a single surface (while facing a single surface). Therefore, the convenience for users can be improved more, as compared to an electric power tool, for example, described in the above-mentioned Unexamined Japanese Patent Application Publication No. 2011-067910 in which separate switch panels are provided on different surfaces.

BRIEF DESCRIPTION OF THE DRAWINGS

The invention will now be described below, by way of examples, with reference to the accompanying drawings, in which.

DETAILED DESCRIPTION OF THE PREFERRED EMBODIMENT

First Embodiment

Figure 1:
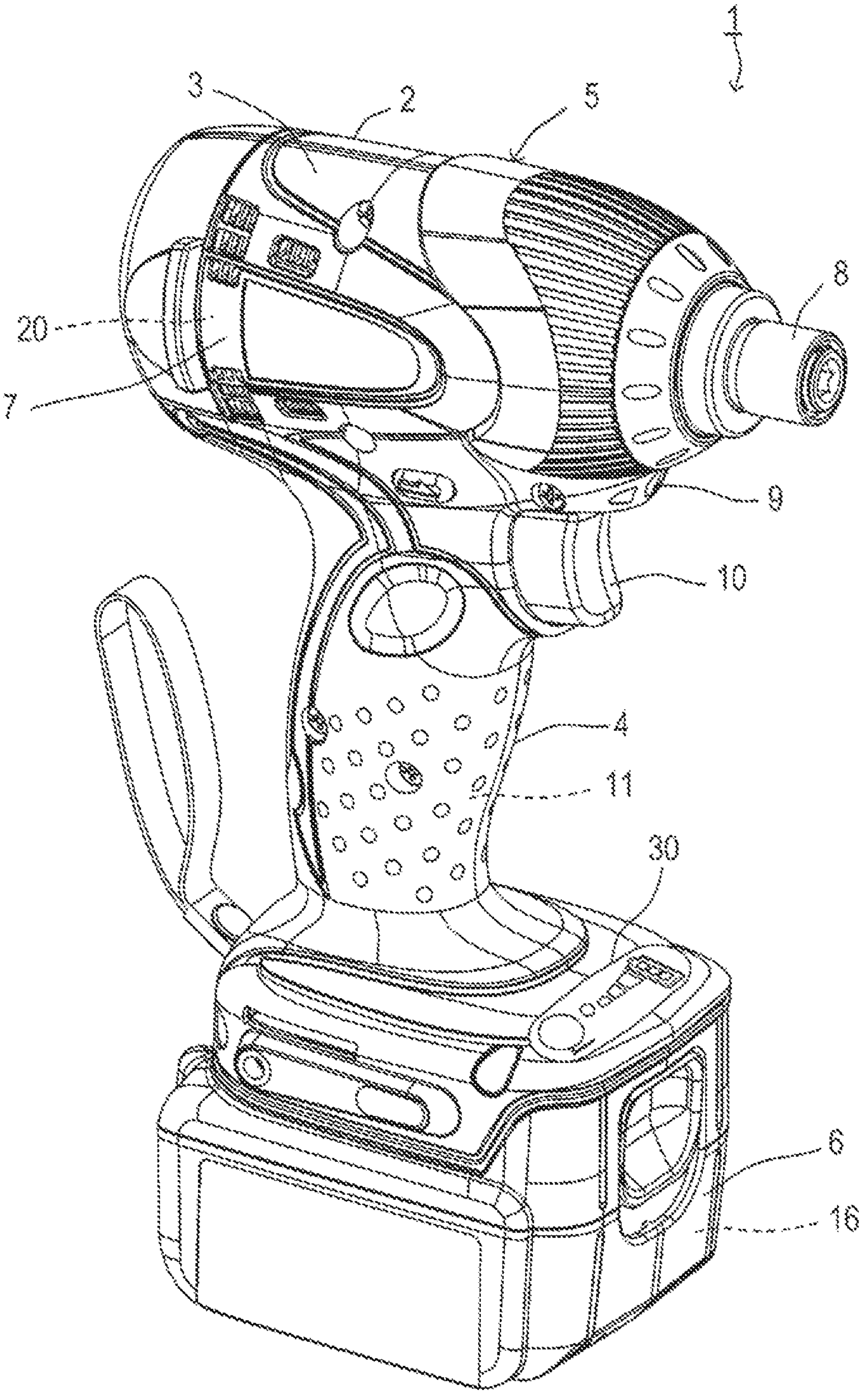
FIG. 1 is a perspective view showing an external appearance of an electric power tool according to an embodiment.

As shown in FIG. 1, an electric power tool 1 according to the present embodiment is constructed as a rechargeable impact driver, and includes a main body housing 5 and a battery pack 6. The main body housing 5 is constituted with left and right housing members 2, 3 being combined. Below the main body housing 5, a handle portion 4 is extendingly disposed. The battery pack 8 is detachably attached to the bottom end of the handle portion 4.

The rear portion of the main body housing 5 is constructed as a motor storing portion 7 that stores a motor 20, which is a driving source of the electric power tool 1. In front of the motor storing portion 7, a driving force transmission mechanism (a deceleration mechanism and the like) and a striking mechanism (both not shown) are stored. On the leading end of the main body housing 5, a sleeve 8 is extrudingly disposed so as to attach a tool bit (which, for example a driver bit, corresponds to an example of the tool, element according to the present invention, but not shown in the drawing) to the leading end of the driving force transmission mechanism.

The rotation of the motor 20 is decelerated via the driving force transmission mechanism and transmitted to the sleeve 8. Based on the rotational force, the striking mechanism provides the sleeve 8 with intermittent striking in the direction of the rotation.

The striking mechanism includes, for example, a spindle, a hammer, and an anvil. The spindle is rotated via the driving force transmission mechanism. The hammer is rotated together with the spindle, and movable in the axial direction. The anvil is disposed in front of the hammer, and a tool bit is attached to the leading end thereof via the sleeve 8.

More specifically, in the striking mechanism, corresponding to the rotation of the motor 20, the spindle is rotated, as a result of which the anvil is rotated via the hammer and the sleeve 8 is thus rotated (and eventually the tool bit is rotated). Subsequently, as screw fastening progresses by the tool bit and the load on the anvil increases, the hammer withstands the urging force of a coil spring and is receded so as to be removed from the anvil. When the hammer is rotated together with the spindle, proceeded by the urging force of the coil spring, and reengaged with the anvil, the intermittent striking is provided to the anvil. As a result, further fastening and the like can be performed. It is to be noted that the striking mechanism as described above is well known and disclosed, for example, in Unexamined Japanese Patent Application Publication No. 2008-218605, and that the detailed description thereof is therefore not repeated here.

In the front side of the upper end of the handle portion 4 in the main body housing 5, a trigger switch 10 is provided. A user of the electric power tool 1 can operate the trigger switch 10 (pulling operation) while holding the handle portion 4.

In the battery pack 6, a battery 16 is installed wherein second battery cells, which generate predetermined DC voltage, are connected in series. The handle portion 4 stores therein a controller 11 that is operated upon receiving power supply from the battery 16 in the battery pack 6, and rotates the motor 20 corresponding to the amount of operation performed on the trigger switch 10.

Moreover, in the main body housing 5 above the trigger switch 10, a light 9 is provided so as to irradiate light in front of the electric power tool 1. The light 9 is turned on when a user operates the trigger switch 10. However, in the present embodiment, the light 9 is not always turned on when the trigger switch 10 is operated. Light setting (corresponding to the lighting modes according to the present invention) indicating whether or not the light 9 is to be turned on when the trigger switch 10 is operated can be changed by a user.

That is, if the light setting is set to an "ON state", the light 9 is turned on when the trigger switch 10 is operated. On the other hand, if the light setting is set to an "OFF state", the light 9 is not turned on even when the trigger switch 10 is operated.

In the lower end side of the handle portion 4, a switch panel 30 is provided, which accepts switching operation so as to change the operation mode and the light setting of the electric power tool 1, displays the operation mode, and so on. The electric power tool 1 according to the present embodiment is provided with four types of operation modes, and constructed such that the operation mode can be changed by a user's switching operation. It is to be noted that the switch panel 30 is disposed, as shown in FIG. 1, on a single surface among the surfaces of the electric power tool 1 which are externally exposed.

The operation modes that the electric power tool 1 according to the present embodiment is provided with are a "LOW mode", a "MID mode", a "HIGH mode", and a "TEKS mode (TEKS is a registered trademark)". In terms of the maximum rotational speed that the motor 20 can obtain as a driving source when the electric power tool 1 is operated as an impact driver (which eventually becomes the maximum impact force for an impact operation), the LOW mode provides the lowest maximum rotational speed (that is, the smallest impact force).

In the MID mode, the maximum rotational speed is higher by a predetermined amount than in the LOW mode that is, the impact force is also larger by a predetermined amount than in the LOW mode. In the HIGH mode, maximum rotational speed is higher by a predetermined amount than in the MID mode (that is, the impact force is also larger by a predetermined amount than in the MID mode). The TEKS mode is used for fastening TEKS screws wherein the electric power tool 1 is basically operated as an impact driver, and the motor 20 is rotated at a predetermined maximum rotational speed from when fastening is started until the screw is seated, and then rotated at maximum rotational speed slower than the maximum rotational speed prior to the seating of the screw.

These four types of operation modes; the LOW mode, the MID mode, the HIGH mode, and the TEKS mode can be selectively changed by a user operating the switch panel 30. It is to be noted that, among the above-described four types of operation modes, the LOW mode, the MID mode, and the HIGH mode are examples of the rotational speed setting modes according to the present invention.

In the electric power tool 1 according to the present embodiment, when a user operates the trigger switch 10, the motor 20 is rotated at predetermined rotational speed, which is determined corresponding to an operation amount (pulling amount) of the trigger switch 10, and which has an upper limit determined according to the maximum rotational speed of the currently selected operation mode.

The motor 20 does not immediately start rotating in response to a slight pulling on the trigger switch 10. The motor 20 is not rotated until the trigger switch 10 is pulled by a predetermined amount (although this amount is small) from the begging of the pulling. When the amount of the pulling exceeds the predetermined amount, the motor 20 starts rotating, and then the rotational speed of the motor 20 increases corresponding to the amount of the pulling (for example, approximately proportional to the amount of pulling). When, the trigger switch 10 is pulled up to a predetermined position (for example, when the trigger switch 10 is pulled to the maximum extent), the rotational speed of the motor 20 reaches the maximum rotational speed of the currently selected operation mode.

Therefore, in the three operation modes; the LOW, the MID, and the HIGH modes, for example, even if the respective amounts of pulling on the trigger switch 10 are the same, the rotational speed of the motor 20 becomes the slowest in the LOW mode, and the fastest in the HIGH mode. Moreover, in the TEKS mode, even if the amount of pulling on the trigger switch 10 is the same, the rotational speed of the motor 20 becomes slower after a TEKS screw is seated as compare to before the screw is seated.

Figure 2A:
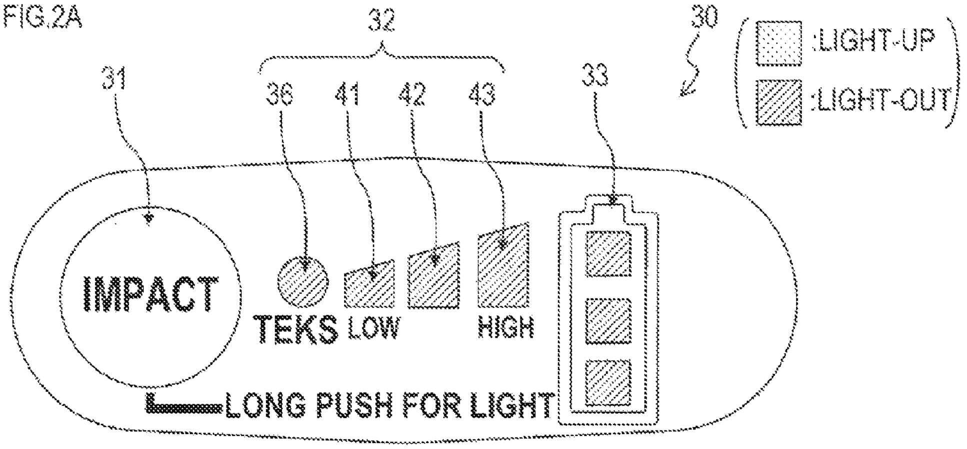
FIGS. 2A-2C are configuration diagrams showing a structure of a switch panel according to a first embodiment.
Figure 2B:
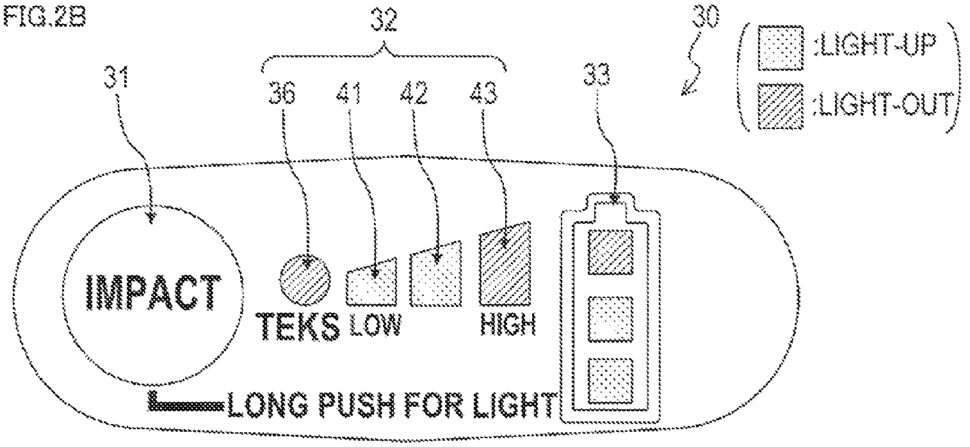
Figure 2C:
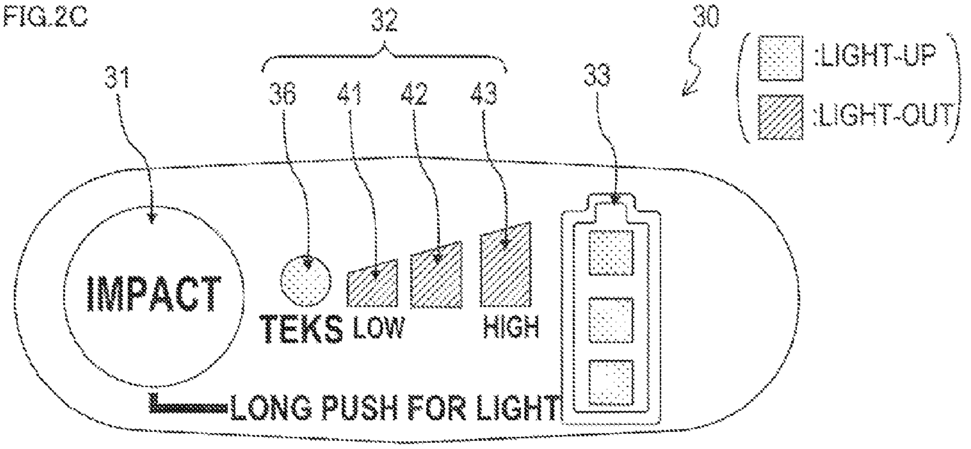

As shown in FIGS. 2A-2C, the switch panel 30 includes: one setting switch 31 that is operated by a user so as to change the operation mode and the light setting; an operation mode display unit 32 in which the operation mode, set via the setting switch 31, is shown; and a battery level display unit 33 in which the level of the battery 16 is shown in a stepwise manner.

In other words, the electric power tool 1 according to the present embodiment is constructed such that the operation mode and the light setting can be changed by a single setting switch 31. More detailed description regarding the way, in which the operation mode switching and the light setting switching are distinguished, will be given hereinafter with reference to FIGS. 4, 5, and so on.

The setting switch 31 is a mechanical switch which is in an OFF state while the switch 31 is not operated, and is turned ON when the switch 31 is pressed by a user.

The battery level display unit 33 is, more specifically, constituted with three LEDs, and, corresponding to the level of the battery 16, a predetermined number of the LED(s) is turned on. That is, the lighting state changes in three steps: when the battery level is in a sufficient degree; when the battery level is in a moderate degree; and when the battery level is in a low degree (however, the tool 1 can be operated). When, the battery level is in the sufficient degree, as shown in FIG. 2C, the three LEDs are all turned on. When the battery level is in the moderate degree, as shown in FIG. 2B, two LEDs except for the top LED are turned on. When the battery level is in the low degree, one LED at the bottom is turned on.

More specifically, the operation mode display unit 32 includes: a LED 36 for indicating the TEKS mode, which is turned on when the operation mode is set to the TEKS mode; a LED 41 for indicating the LOW mode, which is turned on when the operation mode is set to one of the LOW, MID, and HIGH modes; a LED 42 for indicating the MID mode, which is turned on when the operation mode is set to one of the MID and HIGH modes; and a LED 43 for indicating the HIGH mode, which is turned on when the operation mode is set to the HIGH mode.

That is, when the operation mode is set to the TEKS mode, as shown in FIG. 2C, only the LED 36 for indicating the TEKS mode is turned on in the operation mode display unit 32. When the operation mode is set to the LOW mode, only the LED 41 for indicating the LOW mode is turned on in the operation mode display unit 32. When the operation mode is set to the MID mode, as shown in FIG. 2B, two LEDs 41 and 42 for indicating the LOW mode and the MID mode are turned on in the operation mode display unit 32. When the operation mode is set to the HIGH mode, three LEDs 41, 42, 43 for respectively indicating the LOW, MID, and HIGH modes are turned on in the operation mode display unit 32. It is to be noted that FIG. 2A shows a state wherein all the LED provided in the switch panel 30 are turned off.

Figure 3:
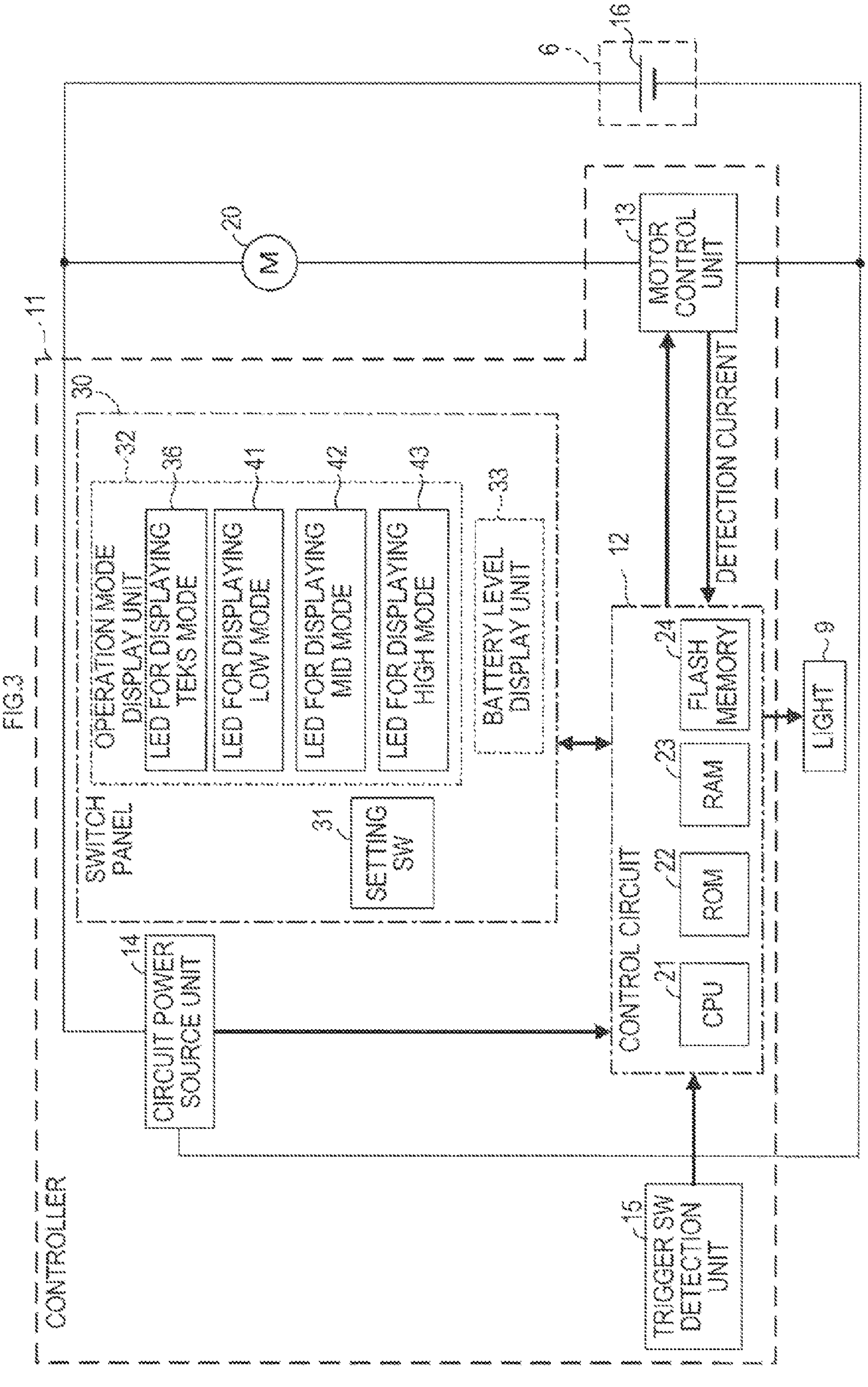
FIG. 3 is a configuration diagram showing a schematic structure of a controller according to the first embodiment.

Next, the controller 11 that controls the driving of the motor 20 will be described with reference to FIG. 3. The controller 11 includes: a control circuit (a microcomputer in the present embodiment) 12; a motor control unit 13; a circuit power source unit 14; and a trigger switch (SW) detection unit 15. The above-described switch panel 30 is also one of the constituents of the controller 11.

The motor 20 according to the present embodiment is made with a three-phase brushless motor, and connected to the battery 16 via the motor control unit 13. The motor control unit 13 rotates the motor 20 by controlling power distribution from the battery 16 to the motor 20, and is constituted with, for example, a known full-bridge circuit, made with six switching elements for changing phases of the power supply corresponding to the rotational position of the motor 20, and a drive circuit that turns on/off each of the switching elements by outputting drive signals to each of the switching elements constituting the full-bridge circuit.

The on/off action of each switching element is controlled by a drive command sent from the control circuit 12. That is, the motor control unit 13 follows the drive command from the control circuit 12, turns on one of the switching elements, to which the drive command is assigned, and drives the element at a duty ratio so as to rotate the motor 20.

Moreover, the motor control unit 13 is provided with a current detection function so as to detect an electric current that flows in the motor 20, and outputs the detected current (more specifically, a voltage signal indicating the detected current) to the control circuit 12.

The circuit power source unit 14 decreases the DC voltage (for example, 14.4V) from the battery 16, and generates controlled voltage (for example, 5V), which is a predetermined DC voltage, so as to supply the controlled voltage to the control circuit 12 and other units in the controller 11. The respective units in the controller 11 are operated by the controlled voltage from the circuit, power source unit 14 as a power source.

The trigger SW detection unit 15 detects an operating state of the trigger switch 10, and outputs a detection result (operating state) to the control circuit 12. Although not shown in the drawing, the trigger SW detection unit 15 includes a driving initiation switch and a variable resistor. The driving initiation switch is in an OFF state while the trigger switch 10 is not operated. When the trigger switch 10 is operated, the driving initiation switch is turned on, and generates driving initiation signals indicating that the trigger switch 10 has been operated. The variable resistor generates voltage corresponding to the operation amount (pulling amount) of the trigger switch 10 (trigger operation amount signals). The driving initiation signals, sent from the driving initiation switch, and the trigger operation amount signals, generated by the variable resistor, are both inputted into the control circuit 12.

In the present embodiment, the control circuit 12 is constructed as a microcomputer including a CPU 21, a ROM 22, a RAM 23, a flash memory 24 and so on. According to various control programs stored in the ROM 22, the control circuit 12 performs various types of control actions with reference, when necessary, to various setting information stored in the flash memory 24. For example, the control circuit 12 performs driving control of the motor 20 via the motor control unit 13, accepts switching operation performed by using the switch panel 30 for changing the operation mode or light setting, performs lighting control with respect to each of the LEDs provided in the switch panel 30, performs lighting control of the light 9 and so on. The setting state of the operation mode and the light setting is stored in the flash memory 24, and the content, stored in the flash memory 24, is renewed at each time when the setting state is changed by a user. It is to be noted that the various control programs are not necessarily stored in the ROM 22, but may alternatively be stored in other memory areas, for example, in the flash memory 24.

Controlling the motor 20 is generally performed as follows. When the trigger switch 10 is operated and the driving initiation signals are consequently inputted from the trigger SW detection unit 15, the control circuit 12 starts PWM control of the motor 20 corresponding to the trigger operation amount signal outputted also from the trigger SW detection unit 15 so that the motor 20 is rotated at the rotational speed corresponding to the operation amount (pulling amount) of the trigger switch 10 which is indicated by the trigger operation amount signals.

That is, a drive duty to be controlled by the motor control unit 13 is set such that the rotational speed becomes larger (in other words, the duty ratio becomes higher) as the pulling amount of the trigger switch 10 increases, in which the maximum rotational speed for the currently-set operation mode is the upper limit. In a state wherein a user pulls the trigger switch 10 to the maximum extent, the drive duty becomes a value corresponding to a value of the maximum rotational speed for the currently-set operation mode.

Moreover, in a case wherein the operation mode is set to the TEKS mode, seating of a TEKS screw needs to be detected. The seating detection is performed based on a detected current from the motor control unit 13. That is, when the rotation of the motor 20 is started and a TEKS screw is seated, the rotational speed of the motor 20 is compulsorily decelerated. This deceleration is shown as a change in the detected current. Therefore, the control circuit 12 detects the seating of the TEKS screw based on the detected current from the motor control unit 13, and changes the maximum rotational speed for before and after the seating.

Controlling the light 9 is performed as follows. When the trigger switch 10 is not operated (non-operated state), the control circuit 12 turns off the light 9. When the trigger switch 10 is operated and the drive initiation signals are inputted from the trigger SW detection unit 15, the control circuit 12 turns on the light 9. While the trigger switch 10 is operated, the control circuit 12 keeps the light 9 on. Moreover, in a case wherein the light 9 is turned on and then the trigger switch 10 falls into the non-operated state, the control circuit 12 keeps the light 9 on for a predetermined period of time (for example, 10 seconds), and then turns off the light 9.

The light 9 can be turned on when the light setting is set to the ON state. Therefore, when the light setting is set to the OFF state, even if the trigger switch 10 is operated, the control circuit 12 does not turn on the light 9.

The following describes the switching control of the operation mode via the switch panel 30, and the lighting control of each of the LEDs in the switch panel 30 which are performed by the control circuit 12. As described above, in the electric power tool 1 according to the present embodiment, a user can change the operation mode and the light setting by using a single setting switch 31. The control circuit 12 performs the switching of the operation mode or the light setting corresponding to the length of time the setting switch 31 is pressed by a user and the like, that is, corresponding to the length of time the setting switch 31 is in the ON state (duration time of the ON state).

More specifically, when the setting switch 31 is turned ON by a user and the like, the control circuit 12 measures the duration time of the On state (ON duration time). This time measuring is performed by, for example, using a timer not shown in the drawing. It is to be noted, that the timer is preferably installed within the control circuit 12.

In a case wherein the ON duration time is shorter than a predetermined period of time (0.7 seconds in the present embodiment), the control circuit 12 changes the operation mode. For example, when the setting switch 31 is pressed and turned ON by a user, and the user releases the setting switch 31 before 0.7 seconds elapse so as to turn OFF the setting switch 31, the operation modes is changed.

A switching order of the operation modes in the present embodiment is: the LOW mode→the MID mode→the HIGH mode→the TEKS mode→the LOW mode . . . . Therefore, when the ON duration time is shorter than 0.7 seconds, the operation mode is changed, in the above-described order at each time when the setting switch 31 is operated.

On the other hand, when the ON duration time is equal to or longer than the predetermined period of time (0.7 seconds), the control circuit 12 changes the light setting. For example, when the setting switch 31 is pressed and turned ON by a user, and 0.7 seconds elapse thereafter (in a case wherein the setting switch 31 is kept being pressed until 0.7 seconds pass), the light setting is changed at the instant when 0.7 seconds elapse.

In the present embodiment, two types of the light setting are provided: the ON state, and the OFF state. The switching order for the light setting by operating the setting switch 31 is: the ON state→OFF state→ON state . . . . Therefore, when the ON duration time is 0.7 seconds or longer, the light setting is alternately changed at each time when the setting switch 31 is operated.

As described above, in the electric power tool 1 according to the present embodiment, users can freely change the operation mode or the light setting depending on providing a long push (maintaining the ON state for 0.7 seconds or longer), or a short push (maintaining the ON state for shorter than 0.7 seconds) to the setting switch 31.

Figure 4:
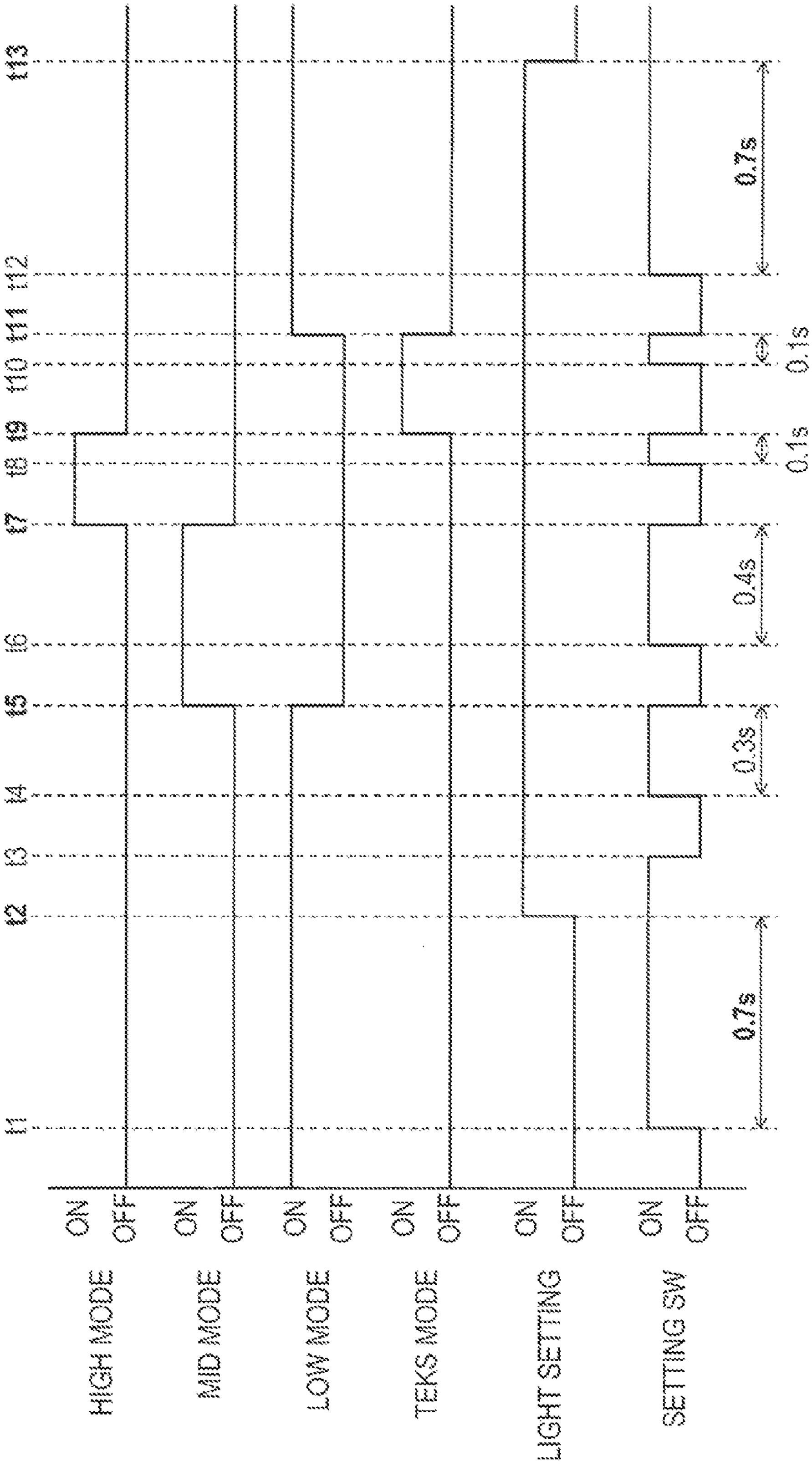
FIG. 4 is a time chart explaining a way in which an operation mode setting and a light setting are changed according to the first embodiment.

One example shown in FIG. 4 regarding the switching transition of the operation mode and the light setting corresponding to the operation of the setting switch 31. In the example shown in FIG. 4, immediately before Time t1, the operation mode is set to the LOW mode, and the light setting is set to the OFF state. It is to be noted that, with regard to the vertical axis of the time chart in FIG. 4, when "ON" is indicated in one of the operation modes, the setting is on that operation mode, whereas when "OFF" is indicated, the setting is not on that operation mode, and when "ON" is indicated in the light setting, the setting is in the "ON" state, whereas when "OFF" is indicated, the setting is in the "OFF" state. The same applies to the time chart in FIG. 7 which will be described later in the second embodiment.

At Time t1, the setting switch 31 is turned ON by a user and the like. When 0.7 seconds elapse (at Time t2) without the setting switch 31 being turned OFF, the light setting is changed to the ON state at the instant when 0.7 seconds elapse. At Time 3, the setting switch 31 is turned OFF. At Time t4, the setting switch 31 is turned ON again, but turned OFF after 0.3 seconds (at Time t5) without being kept ON for 0.7 seconds, the operation mode is changed at the instant when the setting switch 31 is turned OFF. That is, the operation mode is changed from the LOW mode to the MID mode. At Time t6, the setting switch 31 is once again turned ON but turned OFF after 0.4 seconds (at Time t7) without being kept ON for 0.7 seconds, the operation mode is changed from the MID mode to the HIGH mode at the instant when the setting switch 31 is turned OFF.

Thereafter between Time t8 and t9, the setting switch 31 is turned ON for 0.1 second, and the operation mode is changed from the HIGH mode to the TEKS mode. Furthermore, between Time t10 and t11, the setting switch 81 is turned ON for 0.1 second, and the operation mode is changed from the TEKS mode to the LOW mode.

When the setting switch 31 is turned ON once again at Time t12, and the ON state is maintained for 0.7 seconds (Time t13), the light setting is changed from the ON state to the OFF state.

Figure 5:
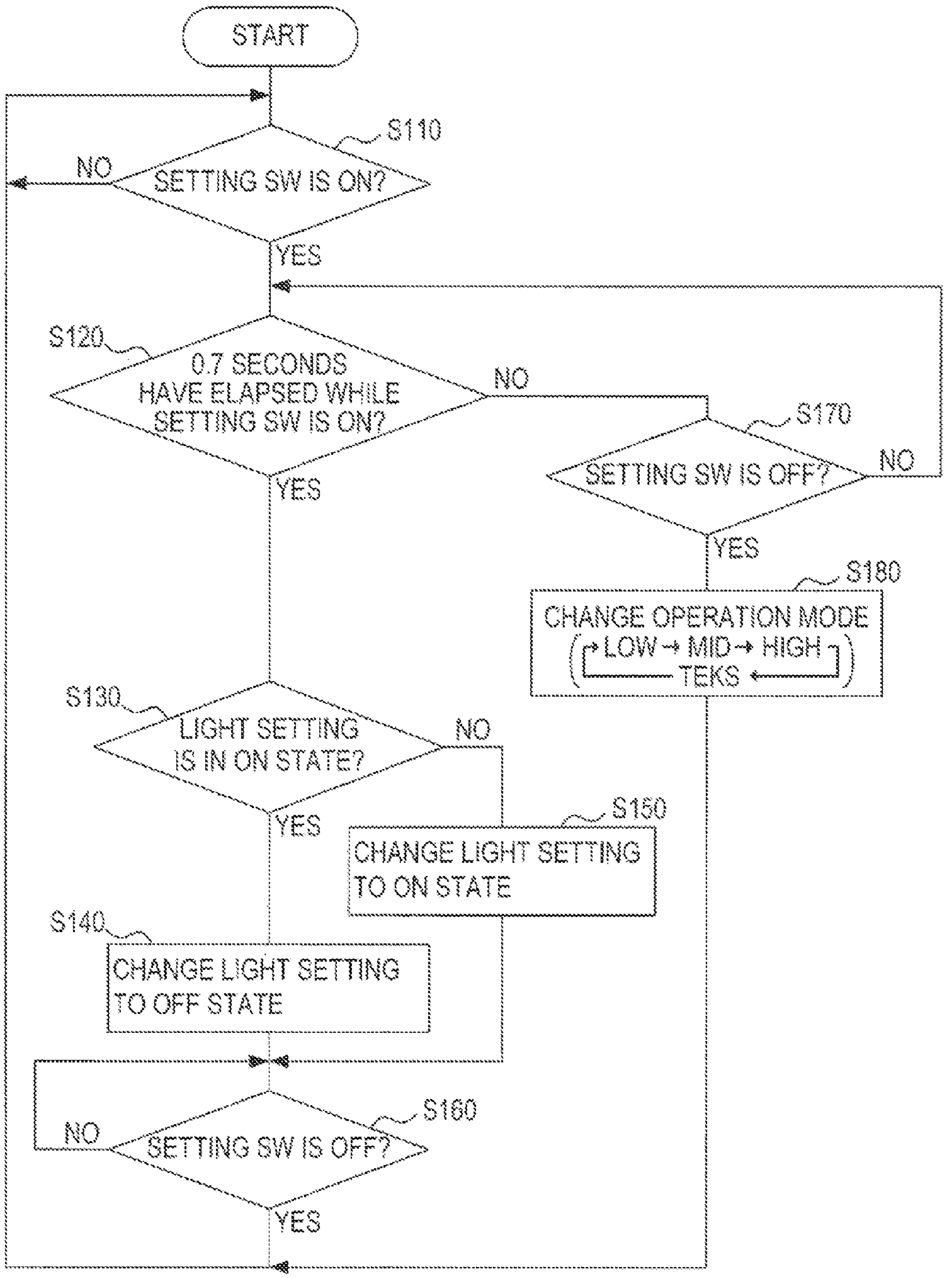
FIG. 5 is a flowchart describing a setting switching control process according to the first embodiment.

Next, a setting switching control process, performed by the control circuit 12 (specifically performed by the CPU 21) in order to change the above-described operation mode and the light setting, will be described with reference to FIG. 5. When the CPU 21 is provided with control voltage from the circuit power source unit 14 and activated, the CPU 21 initiates this setting switching control process.

When the CPU 21 executes the setting switching control process, first in S110, it is determined whether or not the setting switch 31 is turned ON (pressed). While it is determined that the setting switch 31 is not turned ON (not pressed) (S110:NO), the CPU 21 repeats the determination step in S110. If it is determined that the setting switch 31 is turned ON (S110:YES), subsequently in S120, it is determined whether or not 0.7 seconds have elapsed while the setting switch 31 is in the ON state. If it is determined that 0.7 seconds have not elapsed (S120:NO), the process proceeds to S170, and it is determined whether or not the setting switch 31 is turned OFF. If it is determined that the setting switch 31 is not turned OFF (that is, the ON state is maintained) (S170: NO), the process goes back to S120.

If it is determined, in the determination step in S170, that the setting switch 31 is turned OFF (S170:YES), which means that the setting switch 31 is turned OFF without the ON state being maintained for 0.7 seconds, therefore the process proceeds to S180 so as to change the operation mode. That is, the currently-set operation mode is changed to the subsequent operation mode according to the above-described switching order.

It is to be noted that when the CPU 21 changes the operation mode in S180, the CPU 21 may turn on one of the LEDs in the operation mode display unit 32 of the switch panel 30, which is the LED for the most-recently-selected operation mode after the switching, for a predetermined period of time, so that a user can visually recognize that the operation mode has been changed.

The operation mode selected after the switching in S180 is stored in the flash memory 24 as the most-recent operation mode which will be referred to when the control operation for the motor 20 is performed later. Subsequently to the operation mode switching in S180, the process goes back to S110.

On the other hand, if it is determined, in the determination step in S120, that 0.7 seconds have elapsed while the ON state is maintained (S120:YES), the light setting is changed. That is, in S130, it is determined whether or not the current light setting is in the ON state. If it is determined that the light setting is in the ON state (S130:YES), the process proceeds to S140 so as to change the setting to the OFF state. If it is determined that the light setting is in the OFF state (S130: NO), the process proceeds to S150 so as to change the setting to the ON state. The light setting after the switching is stored in the flash memory 24 as the most-recent light setting which will be referred to when the lighting control for the light 9 is performed later.

It is to be noted that when the CPU 21 changes the light setting in S140 or S150, the CPU 21 may turn on the light 9 for a predetermined period of time. Specifically, for example, if the CPU 21 changes the setting to the ON state in S150, the light 9 may be turned on for 10 seconds, and if the CPU21 changes the setting to the OFF state in S140, the light 9 may be momentarily turned on. This will help a user to visually recognize that the light setting has been changed.

Subsequently to the light setting switching in S140 or S150, it is determined in S160 whether or not the setting switch 31 is turned OFF. While the setting switch 31 is maintained to be ON, the determination step in S160 is repeated. When the setting switch 31 is turned OFF, the process goes back to S110.

It is to be noted that the electric power tool 1 according to the present embodiment falls into a sleep mode in order to save the battery 18 when the electric power tool 1 is not used, for example, when a predetermined period of time elapses after the trigger switch 10 is turned OFF, and that only essential functions are active, such as the function so as to detect the trigger switch 10 being turned ON. Thus, during the sleep mode, not only the light 9 is turned off, but all the LEDs in the operation mode display unit 32 are also turned off. However, when the trigger switch 10 is operated by a user and the like while the electric power tool 1 is in the sleep mode, in the operation mode display unit 32 and the battery level display unit 33, the LEDs that are appropriate for indicating the current battery level and the current operation mode are respectively turned on. Moreover, in that event, if the light setting is in the ON state, the light 9 is turned on for a predetermined period of time (for example, for 10 seconds), whereas if the light setting is in the OFF state, the light 9 is turned on for a very short period of time (for example, momentarily).

As described above, in the electric power tool 1 according to the present embodiment, the single setting switch 31 is used for changing both the operation mode setting and the light setting. When the setting switch 31 is operated, the setting that should be changed is distinguished between the operation mode setting and the light setting by the length of the period in which the setting switch 31 is maintained to be ON.

Therefore, the space for disposing the switch for changing the operation mode setting and the light setting can be decreased, which in turn enables to inhibit the electric power tool 1 from being large, and to reduce the cost thereof.

Moreover, when the setting switch 31 is turned ON, if the ON duration time is shorter than the predetermined period of time, the operation mode setting is changed, whereas if the ON duration time is as long as the predetermined period of time or longer, the light setting is changed. That is, for the operation mode setting, which is more frequently changed by a user, the ON duration time required to change the setting is set to be shorter than the ON duration time for changing the light setting. In other words, for the operation mode, a user can change the setting by a short push, while the user can change the setting by a long push for the light setting. Therefore, the electric power tool 1 that is convenient for users can be provided.

Moreover, in terms of the timing for changing the light setting, the electric power tool 1 according to the present embodiment is constructed such that when the setting switch 31 is turned ON and the ON state is still maintained even after the predetermined period of time (0.7 seconds) elapses, the light setting is changed at the instant when the predetermined period of time elapses. Therefore, the light setting can be promptly changed.

Furthermore, three types of operation modes having different maximum speed are provided: the LOW mode, the MID mode, and HIGH mode. Therefore, a user can easily select and set appropriate rotational speed depending on the purpose of the usage of the electric power tool 1. As a result, the electric power tool 1 that is convenient for users can be provided.

Still furthermore, the switch panel 30 is disposed on a single surface among the external surfaces of the electric tool 1. As a result, the users can operate the setting switch 31 and check the displayed content shown by the respective LEDs on the single surface (by facing the single surface).

Second Embodiment

The following describes an electric power tool according to a second embodiment; exclusively the differences from the electric power tool 1 according to the first embodiment. One of the essential structures of the electric power tool according to the present embodiment that is different from the electric power tool 1 according to the first embodiment 1 is the timing for changing the light setting.

In the present embodiment, a control circuit does not change the light setting at the instance when 0.7 seconds elapse after the setting switch 31 is turned ON. Alternatively, the control circuit changes the light setting when the setting switch 31 is turned OFF after the lapse of 0.7 seconds.

It is to be noted that the timing for changing the light setting is not limited to when the setting switch 31 is turned OFF, but can be arbitrarily set to any time after the setting switch 31 is turned OFF. However, having a time lag between when a user turns OFF the setting switch 31 and when the light setting is changed is not necessarily very advantageous from the aspect of the convenience for users. Thus, the light setting is preferably changed when the setting switch 31 is turned OFF.

Moreover, in the present embodiment, the operation mode includes not only one type of TEKS mode as in the first embodiment, but two types of TEKS modes, the first TEKS mode, and the second TEKS mode. That is, five types of operation modes are provided in total in the present embodiment: the LOW mode, the MID mode, HIGH mode, the first TEKS mode, and the second TEKS mode. Among these types of the operation mode, the LOW, the MID, and the HIGH modes are the same as in the first embodiment.

On the other hand, in regard to the TEKS modes, the fastening torque used after seating detection is different between in the first TEKS mode and in the second TEKS mode. That is, before seating, a TEKS screw is fastened at the same rotational speed and the rotational torque as in the first embodiment. For further fastening after the seating is detected, the fastening is performed in the first TEKS mode at slower rotational speed and with smaller rotational torque as compared to the TEKS mode in the first embodiment, whereas, in the second TEKS mode, the rotational speed is faster and the rotational torque is larger than in the first TEKS mode. It is to be noted that the first TEKS mode and the second TEKS mode correspond to examples of the rotational torque setting modes according to the present invention.

The operation mode is changed, also in the present embodiment, at each time when the setting switch 31 is maintained to be ON for shorter than 0.7 seconds by a user and the like. The switching order of the operation mode in the present embodiment is: the LOW mode→the MID mode→the HIGH mode→the first TEKS mode→the second TEKS mode→the LOW mode . . . . Therefore, when the ON duration time is shorter than 0.7 seconds, the operation mode is changed in the above-described order at each time when the setting switch 31 is operated.

As described above, also in the electric power tool 1 according to the present embodiment, users can freely change the operation mode or the light setting depending on providing a long push (ON duration is for 0.7 seconds or longer) or a short push (ON duration is for shorter than 0.7 seconds) to the setting switch 31. However, the light setting is actually changed when the setting switch 31 is turned OFF.

Figure 6:
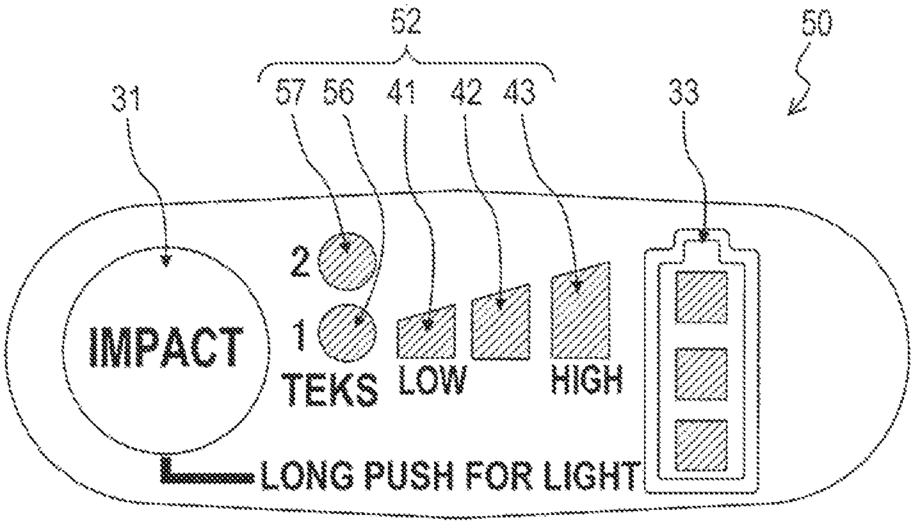
FIG. 6 is a configuration diagram showing a structure of a switch panel according to a second embodiment.

The electric power tool according to the present embodiment has different types of operation mode as compared to the first embodiment. Therefore, the structure of the switch panel is slightly different. FIG. 6 shows the switch panel 50 of the electric power tool according to the present embodiment.

As shown in FIG. 6, the switch panel 50 according to the present embodiment includes an operation mode display unit 52 constituted with five LEDs. Among these LEDs, the LED 41 for indicating the LOW mode, the LED 42 for indicating the MID mode, and the LED 43 for indicating the HIGH mode are identical to the LEDs 41-43 in the first embodiment. In addition to these LEDs, a LED 56 for indicating the first TEKS mode, which is turned on when the operation mode is set to the first TEKS mode, and a LED 57 for indicating the second TEKS mode, which is turned on when the operation mode is set to the second TEKS mode, are also provided.

Figure 7:
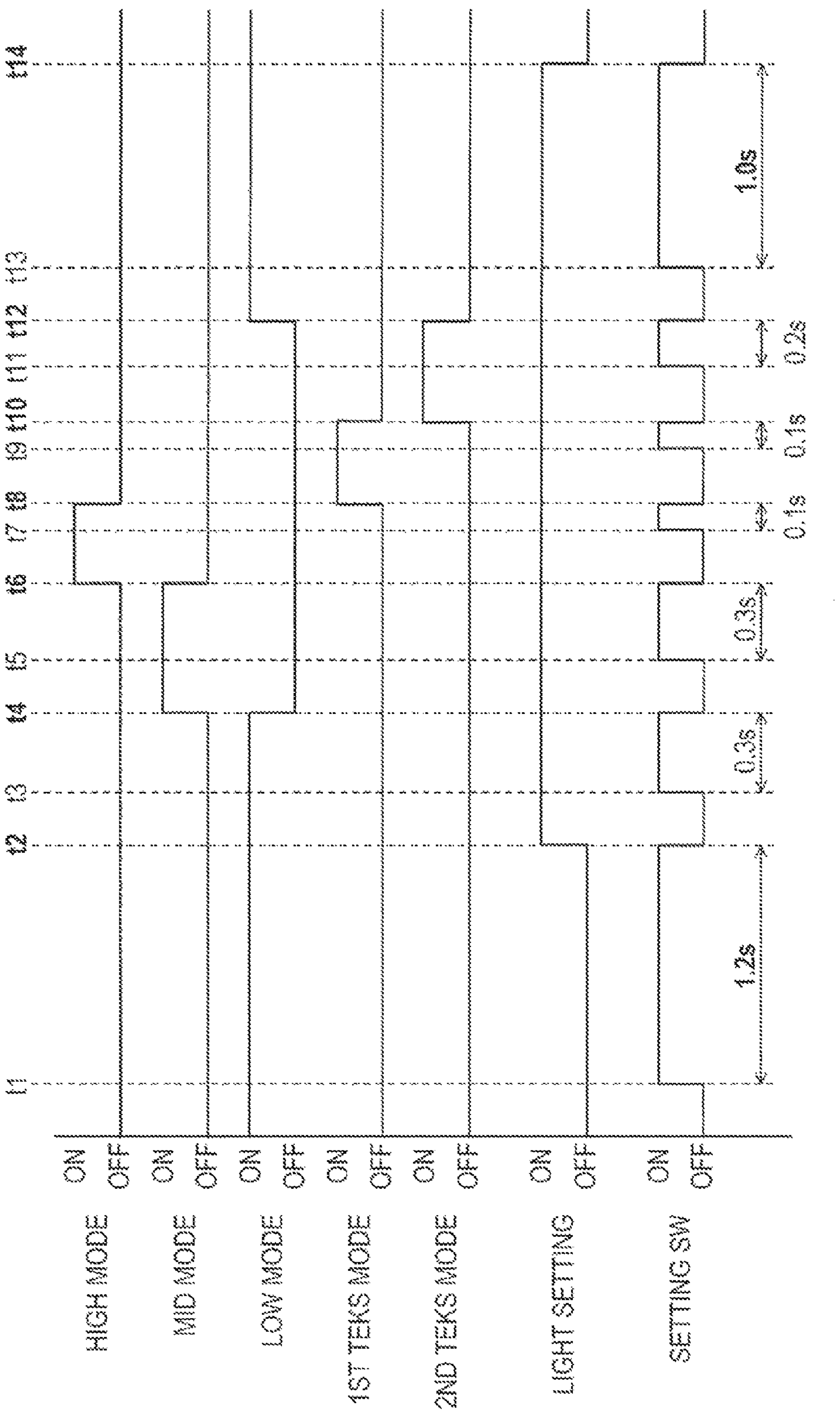
FIG. 7 is a time chart explaining a way in which operation mode setting and a light setting are changed according to the second embodiment.

One example is shown in FIG. 7 regarding the switching transition of the operation mode and the light setting corresponding to the operation of the setting switch 31. In the example shown in FIG. 7, immediately before Time t1, the operation mode is set to the LOW mode, and the light setting is set to the OFF state.

At Time t1, the setting switch 31 is turned ON by a user and the like. When 0.7 seconds elapse without the setting switch 31 being turned OFF, the light setting switching becomes standby. Subsequently, at Time t2, which is when 1.2 seconds elapse after the setting switch 31 is turned ON at Time t1, if the setting switch 31 is turned OFF, the light setting is changed to the ON state.

At Time t3, the setting switch 31 is turned ON again, but turned OFF after 0.3 seconds (at Time t4) without being kept ON for 0.7 seconds, the operation mode is changed from the LOW mode to the MID mode at the instant when the setting switch 31 is turned OFF. At Time t5, the setting switch 31 is once again turned ON, but turned OFF after 0.3 seconds (at Time t6) without being kept ON for 0.7 seconds, the operation mode is changed from the MID mode to the HIGH mode at that instant when the setting switch 31 is turned OFF.

Thereafter, the setting switch 31 is turned ON for 0.1 second between Time t7 and t8, the operation mode is changed from the HIGH mode to the first TEKS mode. Furthermore, the setting switch 31 is turned ON for 0.1 second between Time t9 and t10, the operation mode is changed from the first TEKS mode to the second TEKS mode. Still furthermore, the setting switch 31 is turned ON for 0.2 seconds between Time t11 and t12, the operation mode is changed from the second TEKS mode to the LOW mode.

At Time t13, when the setting switch 31 is turned ON once again, and the ON state is maintained for 0.7 seconds, the light setting switching becomes standby. Then, at Time t14, which is one second after the setting switch 31 is turned ON at Time t13, if the setting switch 31 is turned OFF, the light setting is changed from the ON state to the OFF state.

Figure 8:
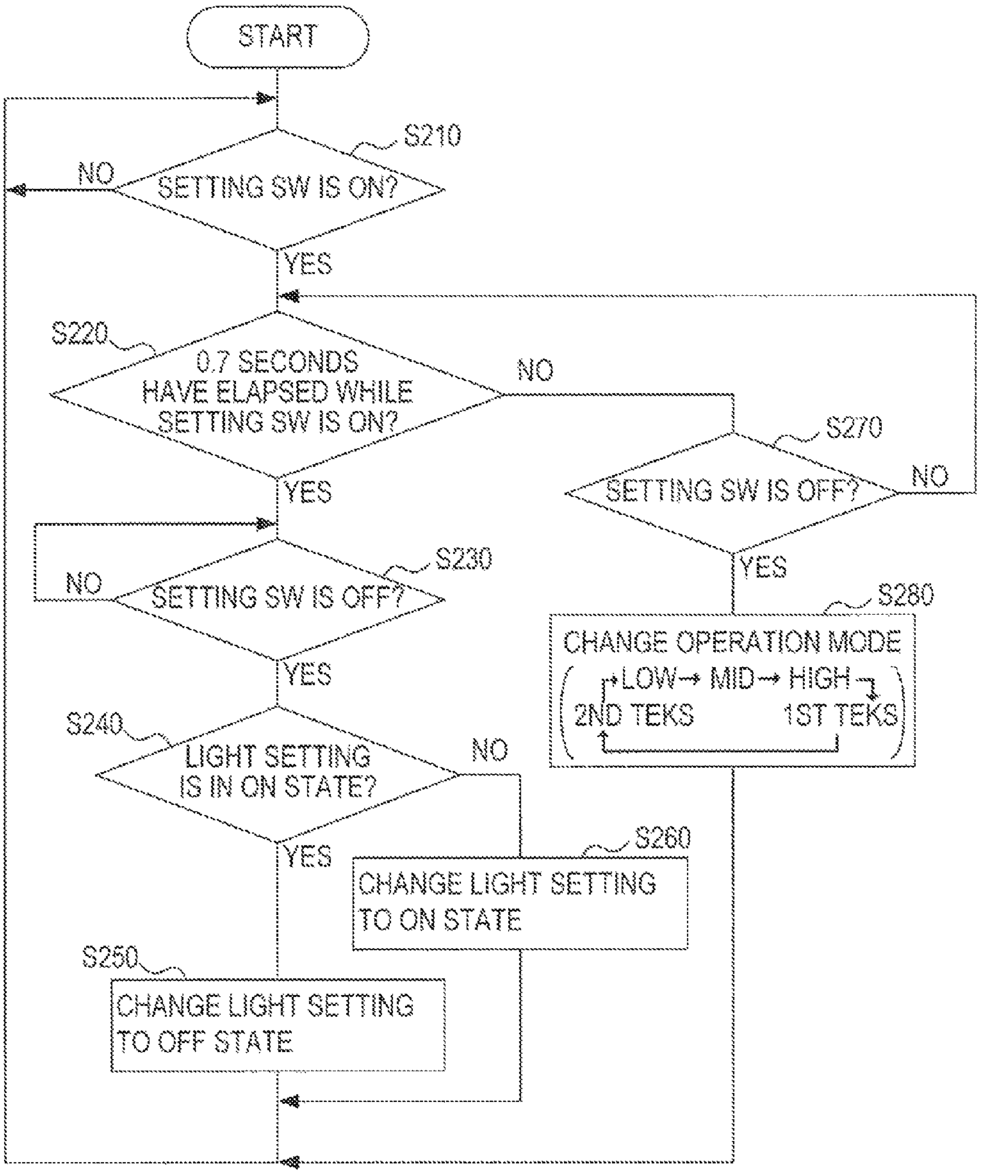
FIG. 8 is a flowchart describing a setting switching control process according to the second embodiment.

Next, a setting switching control process will be described with reference to FIG. 8. When a CPU according to the present embodiment executes this setting switching control process, first in S210, it is determined whether or not the setting switch 31 is turned ON. While it is determined that the setting switch 31 is not turned ON (S210:NO), this determination step in S210 is repeated. If it is determined that the setting switch 31 is turned ON (S210:YES), subsequently in S220, it is determined whether or not 0.7 seconds have elapsed while the setting switch 31 is in the ON state. If it is determined that 0.7 seconds have not elapsed (S220:NO), the process proceeds to S270, and it is determined whether or not the setting switch 31 is turned OFF. If it is determined that the setting switch 31 is not turned OFF (that is, the ON state is maintained) (S270:NO), the process goes back to S220.

If it is determined, in the determination step in S270, that the setting switch 31 is turned OFF (S270:YES), the process proceeds to S280 so as to change the operation mode. That is, the currently set operation mode is changed to the subsequent operation mode according to the above-described switching order.

It is to be noted that when the CPU changes the operation mode in S280, the CPU may turn on one of the LEDs in the operation mode display unit 32 of the switch panel 50, which is the LED for the most-recently-selected operation mode after the switching, for a predetermined period of time, so that a user can visually recognize that the operation mode has been changed.

The operation mode selected after the switching in S280 is stored in the flash memory 24 as the most-recent operation mode which will be referred to when the control operation for the motor 20 is performed later. Subsequently to the operation mode switching in S280, the process goes back to S210.

On the other hand, if it is determined, in the determination step in S220, that 0.7 seconds have elapsed while the ON state is maintained (S220:YES), the light setting switching becomes standby. That is, the light setting is changed after the setting switch 31 is turned OFF.

Specifically, it is determined in S230 whether or not the setting switch 31 is turned OFF, and the determination step in S230 is repeated until the setting switch 31 is turned OFF. When it is determined that the setting switch 31 is turned OFF, the light setting is changed. That is, it is determined in S240 whether or not the current light setting is in the ON state. If it is determined that the light setting is in the ON state (S240: YES), the process proceeds to S250 so as to change the light setting into the OFF state, whereas if it is determined that the light setting is in the OFF state (S240:NO), the process proceeds to S260 so as to change the light setting into the ON state.

The light setting after the switching is also stored in the flash memory 24 as the most-recent light setting which will be referred to when the lighting control for the light 9 is performed later. Moreover, also in the present embodiment, when the CPU changes the light setting in S250 or S260, the CPU may turn on the light 9 for a predetermined period of time. This will help a user to visually recognize that the light setting has been changed. Subsequently to the light setting switching in S250 or S260, the process goes back to S210.

In the electric power tool according to the present embodiment as described above, the single setting switch 31 is also used here for changing both the operation mode setting and the light setting in the same manner as in the electric power tool 1 according to the first embodiment. Therefore, the space for disposing the switch for changing the operation mode setting and the light setting can be decreased, which in turn enables to inhibit the electric power tool from being large, and to reduce the cost thereof.

Moreover, in the present embodiment, the operation mode includes two types of TEKS modes respectively having different rotational torques for after seating of screws. Therefore, when a TEKS screw is to be fastened in the TEKS mode, a user can arbitrarily select one of the two types of TEKS modes so as to fasten a TEKS screw with an appropriate rotational torque.

Variation

The above has explained embodiments of the present invention. However, the present invention is not limited to the above-described embodiment, but may be carried out in various manners within the technical scope of the present invention.

For example, the four types of the operation modes in the first embodiment and the five types of the operation modes in the second embodiment are merely examples of the plurality of operation modes provided to the electric power tool. The electric power tool may obviously be constructed so as to have other types of operation modes.

For example, the electric power tool may be constructed so as to have a plurality of operation modes including at least a drill mode and a clutch mode. The drill mode (corresponding to the basic mode according to the present invention) is an essential operation mode wherein, when the trigger switch 10 is operated, the motor 20 is rotated corresponding to the operation amount of the trigger switch 10. On the other hand, the clutch mode is to stop the rotation of the motor 20. When the motor 20 is started to rotate by the trigger switch 10 being switched on, the rotational torque of the motor 20 is detected. If the detected value is equal to or larger than a predetermined torque threshold, the rotation of the motor 20 is stopped even while the trigger switch 10 is operated.

The rotational torque can be detected by a detection current from the motor control unit 13 (see FIGS. 2A-2C). As publically known, the rotational torque of a motor is proportional to the current that flows into the motor. Therefore, the current that flows into the motor can be information indirectly indicating the rotational torque of the motor. As a result, the rotational torque of the motor 20 can be detected based on the detection current from the motor control unit 13, and the clutch mode can be carried out based on the detected torque.

Figure 9:
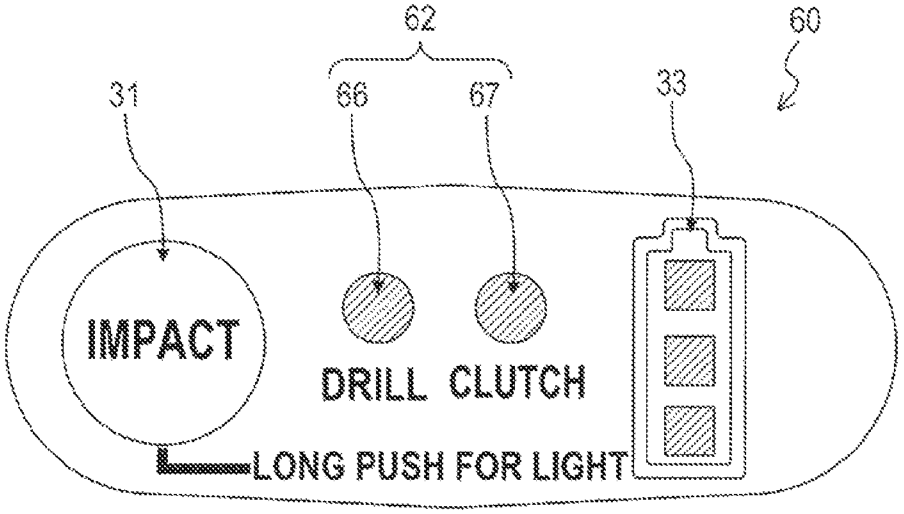
FIG. 9 is a configuration diagram showing another example of the structure of the switch panel.

In the electric power tool having two types of such operation modes, the drill mode and the clutch mode, a switch panel 60 as illustrated in FIG. 9 may be provided. The switch panel 80 shown in FIG. 9 has a difference in the structure of an operation mode display unit 62 as compared to the switch panel 30 according to the first embodiment which is shown in FIGS. 2A-2C. Specifically, the operation mode display unit 62 in the switch panel 60 shown in FIG. 9 includes a LED 66 for indicating the drill mode, which is turned on when the operation mode is set to the drill mode, and a LED 67 for indicating the clutch mode, which is turned on when the operation mode is set to the clutch mode.

In the electric power tool having the drill mode and the clutch mode as described above, the drill mode and the clutch mode are alternately changed at each time when a user and the like provides a short push to the setting switch 31.

Moreover, in the above-described first embodiment, the setting of the operation modes is changed in the order of: the LOW mode→the MID mode→the HIGH mode→the TEKS mode→the LOW mode . . . . However, this order is simply an example. The same applies to the switching order of the operation modes in the second embodiment.

Furthermore, in the above-described embodiments, the light setting is changed by a long push, and the operation mode is changed by a short push. However, this should not necessarily be the same, but may be adversely arranged so that a long push changes operation mode and a short push changes the light setting.

Figure 10:
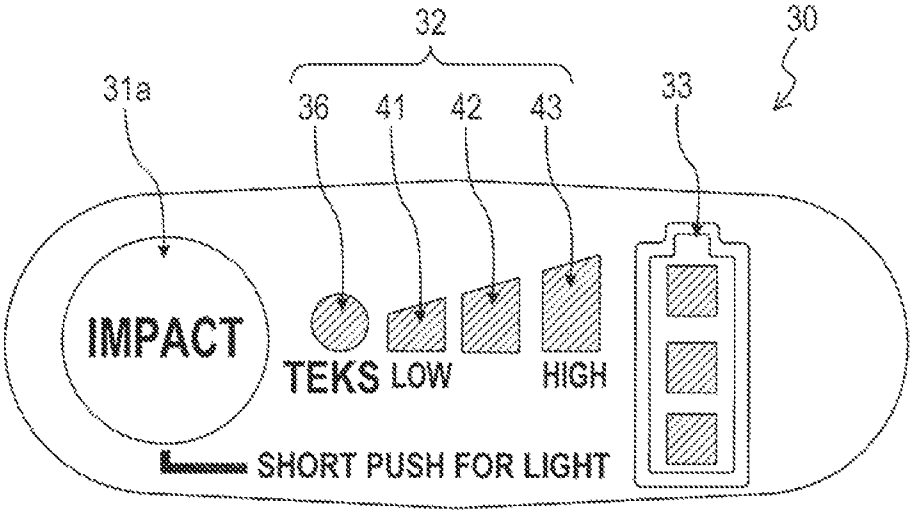
FIG. 10 is a configuration diagram showing still another example of the structure of the switch panel.

That is, in the electric power tool according to the present invention, the structure may be such that when the setting switch is ON and if the duration period of the ON state is shorter than the predetermined period of time, the light setting is changed, and if the duration time of the ON state is equal to or longer than the predetermined period of time, the operation mode is changed. The electric power tool having the above-described structure is provided with a switch panel 30 shown in FIG. 10. The switch panel 30 in FIG. 10 is constructed such that the light setting is changed when a short push is provided to a setting switch 31*a*.

Moreover, regarding the light setting, the above-described embodiments have explained that the ON state (light-up mode) and the OFF state (light-out mode) are alternately changed at each time when a long push is provided. However, having the two types of the light setting is only an example. For example, three types of the light setting may be provided: a bright lighting state (bright lighting mode) wherein the light 9 is turned on in a bright manner, a dim lighting state (dim lighting mode) wherein the light 9 is turned on in a dim manner, and the OFF state wherein the light 9 is not turned on. The three types of the light setting may be sequentially changed. That is, the structure may be such that the lighting intensity of the light 9 can be gradually changed.

Figure 11:
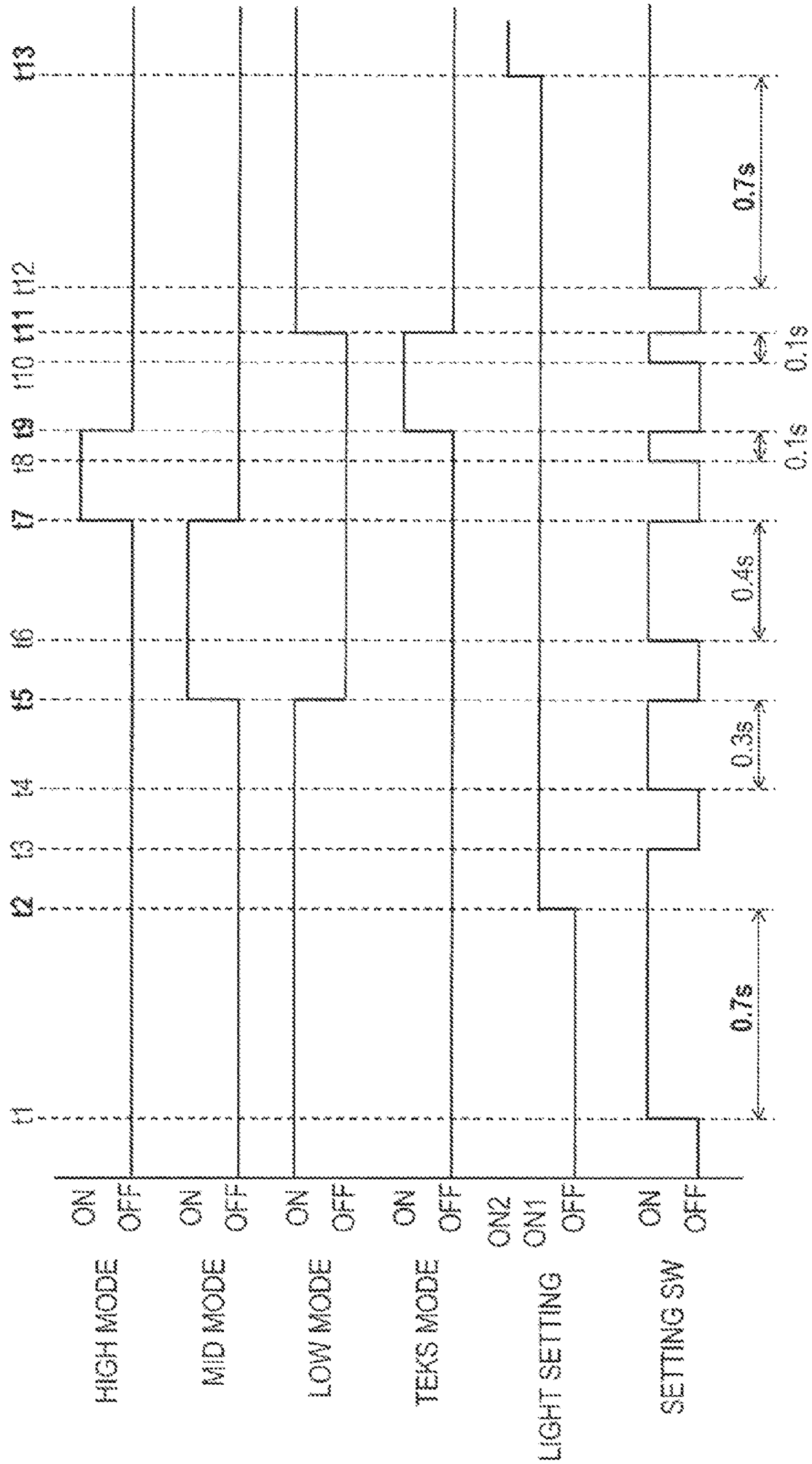
FIG. 11 is a time chart explaining a way in which an operation mode setting and a light setting are changed in another structure according to the present invention.

That is, the electric power tool according to the present invention may be constructed such that the light setting may be provided with at least the light-out mode, wherein, the light 9 is not turned on, and the light-up mode, wherein the light 9 is turned on, and that the light-up mode may include at least two types of light-up modes (for example, the bright lighting mode and the dim lighting mode) in each of which the brightness of the light 9 is different from the other mode (see FIG. 11). In FIG. 11, the dim lighting mode is referred to as "ON 1", and the bright lighting mode is referred to as "ON 2". In the time chart shown in FIG. 11, the settings, except for the light setting, are changed in the same manner as in the first embodiment.

Furthermore, for the LEDs used for indicating the operation modes, LEDs each having a different color to one another may be used for indicating the respective operation modes. The light 9 may also be constructed such that different colors illuminate depending on the operation modes.

Still furthermore, the present invention may be applied not only to a battery type electric power tool such as the electric power tool 1 as described above, but also to an electric power tool operated by receiving alternating current power supplied thereto, or an electric power tool constructed such that tool elements are driven and rotated by an alternating-current motor.

EXPLANATION OF REFERENCE NUMERALS

1 . . . electric power tool, 2,3, . . . housing member, 4, . . . handle portion, 5 . . . main body housing, 6 . . . battery pack, 7 . . . motor storing portion, 8 . . . sleeve, 9 . . . light, 10 . . . trigger switch, 11 . . . controller, 12 . . . control circuit, 13 . . . motor control unit, 14 . . . circuit power source unit, 15 . . . trigger SW detection unit, 16 . . . battery, 20 . . . motor, 21 . . . CPU, 22 . . . ROM, 23 . . . RAM, 24 . . . flash memory, 30,50,60 . . . switch panel, 31 . . . setting switch, 32,52, 62 . . . operation mode display unit, 33 . . . battery level display unit, 36 . . . LED for indicating TEKS mode, 41 . . . LED for indicating LOW mode, 42 . . . LED for indicating MID mode, 43 . . . LED for indicating HIGH mode, 56 . . . LED for indicating first TEKS mode, 57 . . . LED for indicating second TEKS mode, 66 . . . LED for indicating drill mode, 67 . . . LED for indicating clutch mode

What is claimed is:

1. An electric power tool having a plurality of operation modes, the electric power tool comprising:

a lighting unit that radiates light;

a motor that generates rotational driving force so as to drive a tool element;

a setting switch that is turned ON/OFF so as to change a setting of the operation modes and a setting of lighting modes, the lighting modes indicating whether or not the lighting unit is turned on;

a setting switching unit that changes the setting of the operation modes and the setting of the lighting modes corresponding to a manner of operation provided to the setting switch;

a motor control unit that controls the motor according to a control method for one of the operation modes currently set by the setting switching unit; and a lighting control unit that controls whether or not the lighting unit is turned on corresponding to one of the lighting modes currently set by the setting switching unit, wherein, when the setting switch is turned on, the setting switching unit changes either the setting of the operation modes or the setting of the lighting modes depending on a duration time of an ON state of the setting switch.

2. The electric power tool according to claim 1, wherein, when the setting switch is turned on, the setting switching unit changes the setting of the operation modes if the duration time of the ON state is shorter than a predetermined period of time, and changes the setting of the lighting modes if the duration time of the ON state is equal to or longer than the predetermined period of time.

3. The electric power tool according to claim 2, wherein, when the setting switch is turned on, the setting switching unit changes the setting of the lighting modes at an instant when the duration time of the ON state reaches the predetermined period of time.

4. The electric power tool according to claim 2, wherein the setting switching unit changes the setting of the lighting modes when the setting switch is turned on, when the duration time of the ON state reaches the predetermined period of time, and after the setting switch is turned off.

5. The electric power tool according to claim 1, wherein the plurality of the operation modes includes at least two types of rotational speed setting modes each having different rotational speed of the motor, and wherein the motor control unit controls the motor, when the setting of the operation modes is set to one of the rotational speed setting modes, such that rotational speed of the motor corresponds to the rotational speed predetermined in the one of the rotational speed setting modes.

6. The electric power tool according to claim 1, wherein the plurality of the operation modes includes at least two types of rotational torque setting modes each having different rotational torque of the motor, and wherein the motor control unit controls the motor, when the setting of the operation modes is set to one of the rotational torque setting modes, such that rotational torque of the motor corresponds to the rotational torque predetermined in the one of the rotational torque setting modes.

7. The electric power tool according to claim 1, further comprising:

a start-up switch operated so as to rotate the motor; and a torque detection unit that detects rotational torque of the motor, wherein the plurality of the operation modes includes at least: a basic mode in which the motor is rotated while the start-up switch is on; and a clutch mode in which, when the motor is started to rotate by the start-up switch being turned on and the rotational torque detected by the torque detection unit becomes equal to or larger than a predetermined torque threshold, the rotation of the motor is stopped even if the start-up switch is on.

8. The electric power tool according to claim 1, further comprising a display unit that shows one of the plurality of the operation modes that is currently set, wherein the setting switch and the display unit are disposed on a single surface among externally exposed surfaces of the electric power tool.

9. The electric power tool according to claim 1, wherein, when the setting switch is turned on, the setting switching unit changes the setting of the lighting modes when the duration time of the ON state of the setting switch is shorter than a predetermined period of time, whereas the setting switching unit changes the setting of the operation modes when the duration time of the ON state is equal to or longer than the predetermined period of time.

10. The electric power tool according to claim 1, wherein the lighting modes include at least:

a light-out mode in which the lighting unit is not turned on; and a light-up mode in which the lighting unit is turned on, and wherein the light-up mode includes at least two types of light-up modes in each of which an intensity of the lighting unit is different from each other.

11. The electric power tool according to claim 1, further comprising a start-up switch operated so as to rotate the motor, wherein the setting switch is a single switch distinctive from the start-up switch.

* * * * *